United States Patent
Aust et al.

(10) Patent No.: US 9,074,632 B2
(45) Date of Patent: Jul. 7, 2015

(54) RADIAL ROLLER BEARING

(75) Inventors: Jan-Rene Aust, Erlangen (DE); Heinz Schäfers, Erlangen (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 14/009,267

(22) PCT Filed: Feb. 3, 2012

(86) PCT No.: PCT/EP2012/051862
§ 371 (c)(1),
(2), (4) Date: Oct. 1, 2013

(87) PCT Pub. No.: WO2012/139783
PCT Pub. Date: Oct. 18, 2012

(65) Prior Publication Data
US 2014/0029887 A1   Jan. 30, 2014

(30) Foreign Application Priority Data
Apr. 15, 2011   (DE) .......................... 10 2011 007 458

(51) Int. Cl.
*F16C 33/34*   (2006.01)
*F16C 23/10*   (2006.01)
*F16C 43/04*   (2006.01)
*F16C 33/51*   (2006.01)
(Continued)

(52) U.S. Cl.
CPC .............. *F16C 33/51* (2013.01); *F16C 33/605* (2013.01); *F16C 35/063* (2013.01); *F16C 35/067* (2013.01); *F16C 19/26* (2013.01); *F16C 2226/74* (2013.01)

(58) Field of Classification Search
CPC ........ F16C 19/26; F16C 33/605; F16C 33/51; F16C 33/581; F16C 35/063; F16C 35/067
USPC ................. 384/539, 547, 560–561, 566, 572, 384/578–579, 588, 614–615, 447, 564, 585
See application file for complete search history.

(56) References Cited

U.S. PATENT DOCUMENTS 3,424,507 A * 1/1969 Moroney et al. ............... 384/454
4,776,709 A * 10/1988 Tooley ........................... 384/482
(Continued)

FOREIGN PATENT DOCUMENTS

DE   767 618   1/1953
DE   1 667 026   11/1953
(Continued)

OTHER PUBLICATIONS

Schäffler KG: "Wälzlager", vol. 1 (2008) XP002672771, 742.

*Primary Examiner* — Marcus Charles
(74) *Attorney, Agent, or Firm* — Fitzpatrick, Cella, Harper & Scinto

(57) ABSTRACT

A radial roller bearing comprises a smooth cylindrical outer ring inserted in a housing with a roller race arranged in the outer ring. The roller race is formed by a plurality of roller-shaped rolling elements inserted in a bearing cage, which holds said rolling elements evenly spaced in a circumferential direction. The rolling elements roll off an outer raceway formed by the inner shell surface of the outer ring, and off an inner raceway formed by the outer shell surface of a shaft to be mounted, or formed by a smooth cylindrical inner ring fitted onto the shaft. The axial guidance of the roller race is accomplished by way of two separate flanged rings abutting the axial sides of the outer ring which, together with the outer ring are axially fixed in place by way of safety elements engaging with circumferential grooves in the housing. The safety elements for the flanged rings and the outer ring, and the flanged rings are fixedly connected.

5 Claims, 3 Drawing Sheets

(51) Int. Cl.
*F16C 33/60* (2006.01)
*F16C 35/063* (2006.01)
*F16C 35/067* (2006.01)
*F16C 19/26* (2006.01)

(56) References Cited

U.S. PATENT DOCUMENTS 5,595,272 A * 1/1997 Zhou .......................... 192/45.02
2011/0139125 A1 * 6/2011 Tisch ........................... 123/495

FOREIGN PATENT DOCUMENTS

| DE | 29 31 348 | | 2/1981 | | |
|---|---|---|---|---|---|
| DE | 4115758 | A1 * | 11/1992 | ............... | F16C 33/36 |
| EP | 407366 | A2 * | 1/1991 | ............... | F16C 33/66 |
| FR | 2378206 | A * | 9/1978 | ............... | F16D 23/14 |
| GB | 493 886 | | 10/1938 | | |
| GB | 723447 | A * | 2/1995 | ............... | D01H 7/04 |
| JP | EP 0379490 | B1 * | 3/1992 | ............... | F16C 25/08 |
| JP | 2009190655 | A * | 8/2009 | ............... | F16C 19/38 |
| WO | WO 9220940 | A1 * | 11/1992 | ............... | F16C 33/36 |

* cited by examiner

RADIAL ROLLER BEARING

This application is a National Phase of PCT Application No. EP2012/051862 filed Feb. 3, 2012, which in turn claims benefit of German Patent Application No. 10 2011 007 458.9 filed Apr. 15 2011.

FIELD OF THE INVENTION

The invention concerns a radial roller bearing, which bearing can be used particularly advantageous as a movable bearing for high radial forces and low axial forces for the mounting of shafts and rotating parts.

BACKGROUND OF THE INVENTION

It is general knowledge in the field of rolling bearings technology that shafts and rotating parts, are mostly mounted at two mounting points configured as a fixed bearing and a movable bearing because, in this way, manufacturing tolerances and length variations caused by thermal expansions between the shaft and a housing or between an axle and the rotating part can be compensated for without additional clamping forces acting on the bearing. The fixed bearing that is fixed in axial direction takes up, in addition to its radial force fraction also all axial forces in both directions, whereas the movable bearing transmits only its radial load fraction because it is not fixed in axial direction and therefore, as a result, cannot take up any axial force. The compensation of manufacturing tolerances and thermal expansions is thus effected exclusively through the movable bearing, more specifically at the two seating point of the inner ring, at the seating point of the outer ring of in the bearing itself.

A generic radial rolling bearing for a typical movable mounting of a radially highly loaded shaft is known, for example, from DE 2 931 348 A1. This movable bearing configured as a radial cylindrical roller bearing is made up substantially of a smooth cylindrical outer ring which is inserted into a housing and of a roller crown ring arranged in this outer ring, this crown ring being formed by a plurality of rolling elements which are inserted into a bearing cage and retained by this uniformly spaced in peripheral direction. The rolling elements configured as cylindrical rollers roll on an outer raceway formed by the inner peripheral surface of the outer ring and on an inner raceway formed by the outer peripheral surface of a smooth cylindrical inner ring which is slipped onto the shaft, which inner raceway is formed in other applications also by the outer peripheral surface of the shaft itself. In addition, for an axial guidance of the roller crown ring, two separate flanged disks are arranged on the axial sides of the outer ring, which flanged disks, together with the outer ring, are fixed in place against an axial displacement, on one side by a snap ring that engages into a circumferential groove in the housing and, on the other side by a fixing element configured as an adjustable tension ring.

Further, another generic radial roller bearing configured as a double row needle roller bearing for a movable mounting of a radially highly loaded rotating part is known from a catalogue of the applicant, October 2008 Edition, page 742, under the designation NAO..-ZW-ASR1. In this needle roller bearing likewise made up substantially of a smooth cylindrical inner ring that is slipped onto an axle, a roller crown ring arranged on the inner ring and a smooth cylindrical outer ring that is inserted into a rotating part, the axial guidance of the roller crown is, however, effected through two separate flanged disks that bear against the axial sides of the inner ring, which flanged disks, together with the inner ring, are fixed in place in axial direction by two fixing elements that are configured as snap rings and engage into circumferential grooves in the axle.

A drawback of both the aforesaid radial roller bearings is, however, that the axial fixing of the outer and the inner ring as also of the adjoining flanged disks in the housing or on the axle is effected through two additional components that, in the case of large bearing piece numbers, are delivered by the bearing manufacturer in separate magazines, in addition to the flanged disks that are likewise already delivered in a loose state. The, as it is high complexity and costs of assembly of such radial roller bearings are thus further increased by the laborious step of removing the fixing elements out of the magazine and through the necessary use of separate assembly tools for these fixing elements, so that such bearings have proved to be extremely uneconomical.

OBJECT OF THE INVENTION

Starting from the aforesaid drawbacks of the known state of the art, the object of the invention is therefore to conceive a radial roller bearing of the two initially described types, the assembly of which is simplified and possible without the use of separate assembly tools and which is therefore characterised by low assembly costs.

DESCRIPTION OF THE INVENTION

This object is achieved through a radial roller bearing with fixing elements for flanged disks and for an outer and inner ring, as well as the flanged disks configured as a fixedly connected assembly.

The invention is therefore based on the not very obvious perception that it is possible, through a suitable form of integration of the fixing elements with the flanged disks, to minimise on the one hand the number of components and thus the delivery quantity required for such radial roller bearing from the manufacturer and, on the other hand, at the same time, to considerably reduce the complexity and costs of assembly because the step of removing the fixing elements out of the magazine can be omitted and insertion or placement of the flanged disks into a housing or on an axle can be performed in one single work step without separate assembly tools.

Preferred embodiments and advantageous developments of the two types of a radial roller bearing configured according to the invention will be described herein.

In a first embodiment of a radial roller bearing, the fixing elements are formed by two spring rings with an elliptical shape, the transverse axes of which are smaller and the longitudinal axes of which are larger than the diameter of the flanged disks, the spring rings being fixed with their smaller diameter regions on the outer sides of the flanged disks and having an elastically inwards yielding configuration in their larger diameter regions. Thus, the elliptical spring rings are fixed with their smaller diameter regions in such a way on the flanged disks that their larger diameter regions protrude slightly beyond the flanged disks. During the assembly of the flanged disks, the spring rings are deformed by force of hand onto the diameter of the flanged disks in order to be able to insert the flanged disks into the bearing bore of the housing and to push them in this bearing bore up to the outer ring. In the end position of the flanged disks, the larger diameter regions of the snap rings then spring automatically into a circumferential groove in the housing, so that both the flanged disks as well as the outer ring of the radial roller bearing are fixed in axial direction.

In a further embodiment of the radial roller bearing, the fixing elements are formed respectively by two shortened semi-segments of two spring rings having an elliptical shape that are split longitudinally centrally, the transverse axes of which are smaller and the longitudinal axes of which are larger than the diameter of the flanged disks, the semi-segments being fixed respectively with their central regions on the outer sides of the flanged disks and having an elastically inwards yielding configuration in their end regions. This form of embodiment thus differs from the first form of embodiment by the fact that the elliptical spring rings are split along their longitudinal axes into two semi-segments that are slightly shortened in their respective ends but protrude slightly beyond the flanged disks with these ends. The assembly of the flanged disks configured with these fixing elements is then performed in the same manner as in the first form of embodiment till the end regions of the semi-segments yield automatically inwards into a circumferential groove in the housing. Alternatively, it would however also be possible, in place of the semi-segments of elliptical spring rings, to fix respectively two straight spring rods in such a way with their central regions on the outer sides of the flanged disks that the end regions of the spring rods protrude slightly beyond the outer diameter of the flanged disks and likewise have an elastically inwards yielding configuration.

In another embodiment of a radial roller bearing according to the invention, the fixing elements are formed by two respective parallel spring wire segments arranged in a secant-like relationship to the inner diameter of the flanged disks, which spring wire segments are fixed with their ends on the outer sides of the flanged disks and are configured to yield elastically outwards in their central regions. Because the inner diameter of the flanged disks corresponds approximately to the diameter of the radial roller bearing, this means that the distance between the spring wire segments is smaller than the diameter of the axle and that through their central regions, the spring wire segments narrow the bores in the flanged disks partially. During assembly of the flanged disks, these spring wire segments are then likewise widened by force of hand to the diameter of the axle in order to be able to push the flanged disks onto the axle and to displace them on the axle up to the inner ring of the radial roller bearing. In the end position of the flanged disks, the spring wire segments then yield automatically elastically into a circumferential groove in the axle, so that both the flanged disks as well as the inner ring of the radial roller bearing are fixed in axial direction. In place of the fixing of the spring wire segments with their ends on the outer sides of the flanged disks, it is likewise conceivable to fix them only with one end on the outer sides of the radial roller bearing so as to enhance their elasticity.

In another embodiment of the radial roller bearing configured according to the invention, the fixing elements are formed by two respective parallel spring wire segments arranged in a secant-like relationship to the inner diameter of the flanged disks, which spring wire segments are fixed with their ends on the outer sides of the flanged disks and the central regions of the spring wire segments are cut apart and configured to yield elastically outwards. This form of embodiment differs from the aforesaid form of embodiment above all by the fact that each spring wire segment is additionally split longitudinally centrally into two semi-segments in order to enable the use of stiffer spring wire segments and to thus enhance their elasticity. The assembly of the flanged disks configured with such fixing elements is then performed in the same manner as in the aforesaid form of embodiment till the spring wire segments yield automatically inwards into a circumferential groove in the axle.

Finally, in a proposed feature for all the forms of embodiment of both types of radial roller bearings configured according to the invention, the fixing of the fixing elements on the outer sides of the flanged disks can be performed either by fusion of materials through welding, soldering or gluing points, or by positive engagement through stampings that are coped out of the flanged disks and surround the fixing elements. For these stampings for each fixing point, two metal strips are coped out of the flanged disks in such a way that the distance between these strips corresponds to the width of the fixing element and the strips project at a right angle from the flanged disks. The fixing element is then placed between these metal strips and, in a last step, the metal strips are bent around the fixing elements.

BRIEF DESCRIPTION OF THE DRAWINGS

The above-described types of a radial rolling bearing configured according to the invention will be elucidated more closely below with reference to two preferred forms of embodiment of each type and to the appended drawings. The figures show.

DETAILED DESCRIPTION OF THE DRAWINGS

Figure 1:
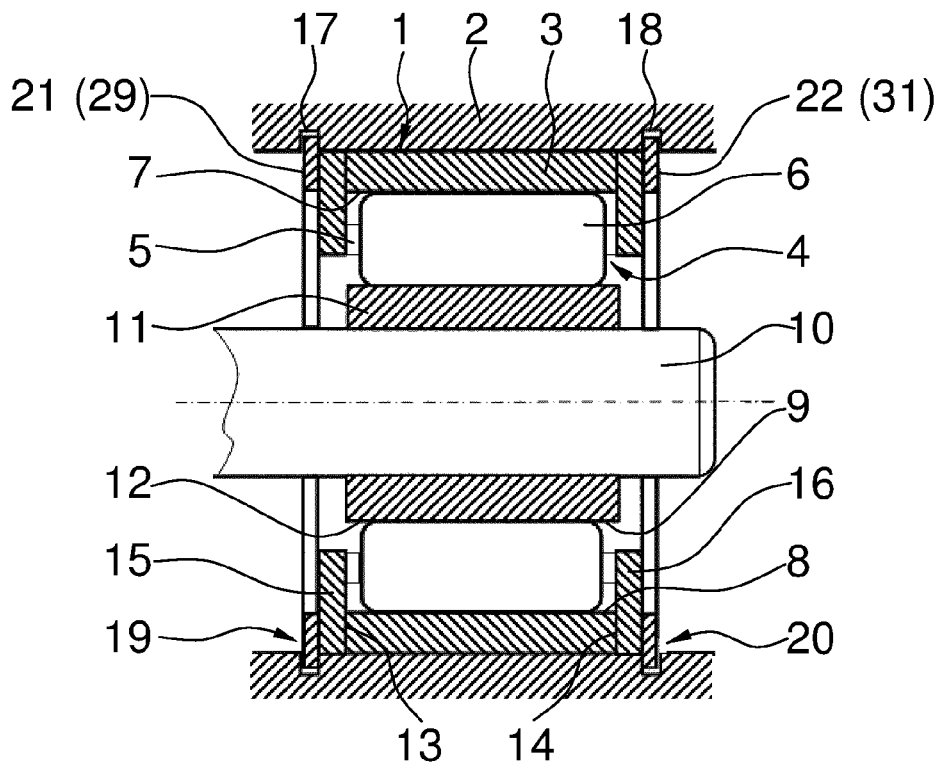
FIG. 1, a schematic representation of the cross-section A-A according to FIG. 2 through a bearing arrangement showing a first type of a radial rolling bearing configured according to the invention.

FIG. 1 shows a schematic representation of a first type of a radial roller bearing 1 which is made up substantially out of a smooth cylindrical outer ring 3 which is inserted into a housing 2 and of a roller crown ring 4 which is arranged in this outer ring 3. This roller crown ring 4 is formed by a plurality of roller-shaped rolling elements 6 which are inserted into a bearing cage 5 and retained uniformly spaced in peripheral direction by the cage 5. These rolling elements 6 roll on an outer raceway 8 formed by the inner peripheral surface 7 of the outer ring 3 and on an inner raceway 12 formed by the outer peripheral surface 9 of a smooth cylindrical inner ring 11 which is slipped onto a shaft 10. It is to be seen clearly that the axial guidance of the roller crown ring 4 is accomplished through two separate flanged disks 15, 16 that bear against the axial sides 13, 14 of the outer ring 3, which flanged disks 15, 16 together with the outer ring 3 are fixed in axial direction by fixing elements 19, 20 which engage into circumferential grooves 17, 18 in the housing 2, which fixing elements 19, 20 and flanged disks 15, 16, are configured according to the invention as a fixedly connected assembly.

Figure 2:
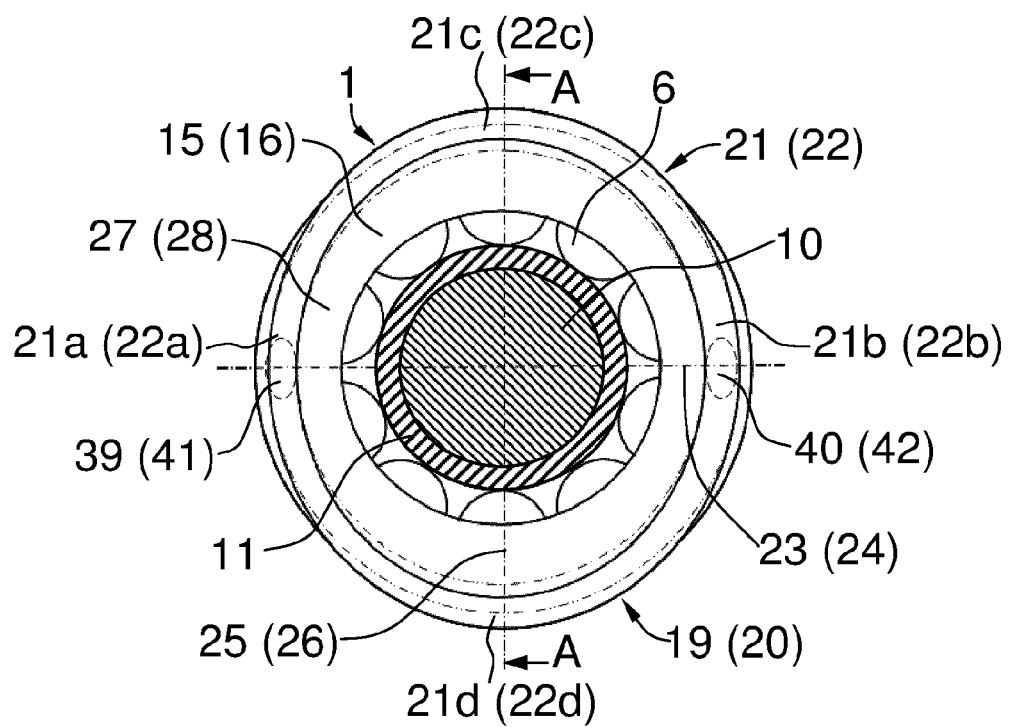
FIG. 2, a schematic representation of a side view of a first form of embodiment of the radial rolling bearing configured according to the invention according to FIG. 1.

It can be further seen in FIG. 2 that the fixing elements 19, 20 in a first form of embodiment of the radial roller bearing 1 according to the invention are formed by two spring rings 21, 22 of elliptical shape which are smaller along their transverse axes 23, 24 and larger along their longitudinal axes 25, 26 than the diameter of the flanged disks 15, 16. The spring rings 21, 22 are fixed with their smaller diameter regions 21a, 21b, 22a, 22b by welding, soldering or gluing points 39, 40, 41. 42 on the outer sides 27, 28 of the flanged disks 15, 16 and are configured in their larger diameter regions 21c, 21d, 22c, 22d which protrude slightly beyond the flanged disks to yield elastically inwards in such a way that, during assembly of the flanged disks 15, 16, these regions can be deformed by force of hand onto the diameter of the flanged disks 15, 16 and spring in their end position automatically into the circumferential grooves 17, 18 in the housing 2.

Figure 3:
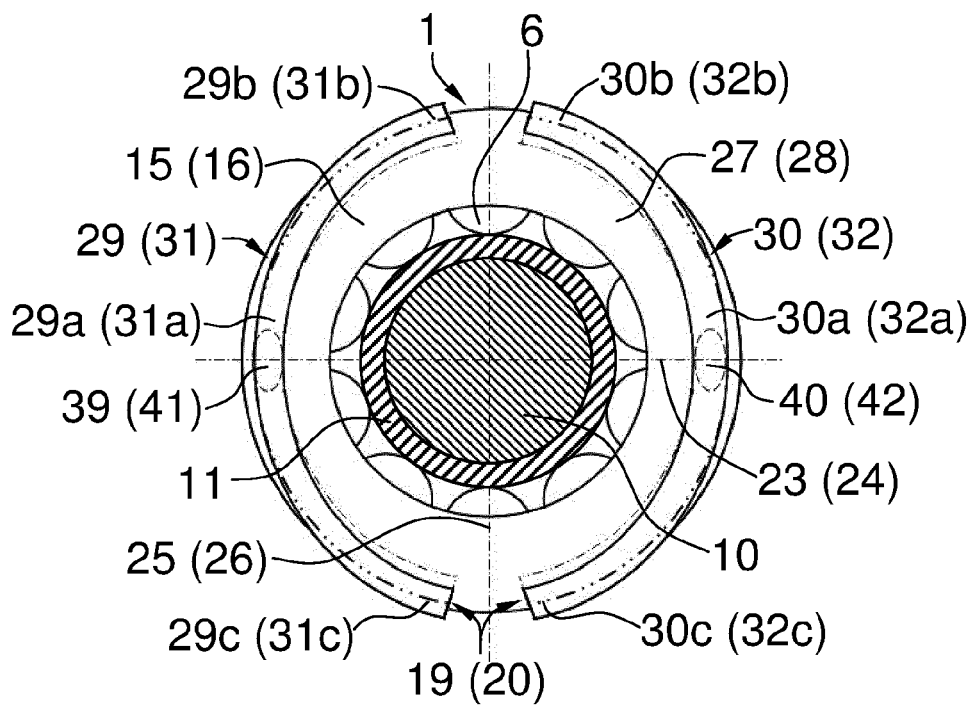
FIG. 3, a schematic representation of a side view of a second form of embodiment of the radial rolling bearing configured according to the invention according to FIG. 1.

In contrast, in the second form of embodiment of the radial roller bearing 1 configured according to the invention illustrated in FIG. 3, the fixing elements 19, 20 are formed respectively by two shortened semi-segments 29, 30, 31, 32 of two elliptically shaped and longitudinally centrally split spring rings which, similar to the first form of embodiment, are smaller along their transverse axes 23, 24 and larger along their longitudinal axes 25, 26 than the diameter of the flanged disks 15, 16. These semi-segments 29, 30, 31, 32, too, are fixed their central regions 29a, 30a, 31a, 32a by welding, soldering or gluing points 39, 40, 41, 42 on the outer sides 27, 28 of the flanged disks 15, 16, and their end regions 29b, 29c, 30b, 30c, 31b, 31c, 32b, 32c are configured to yield elastically inwards in such a way that, during assembly of the flanged disks 15, 16, these regions be deformed by force of hand onto the diameter of the flanged disks 15, 16 and spring in their end position automatically into the circumferential grooves 17, 18 in the housing 2.

Figure 4:
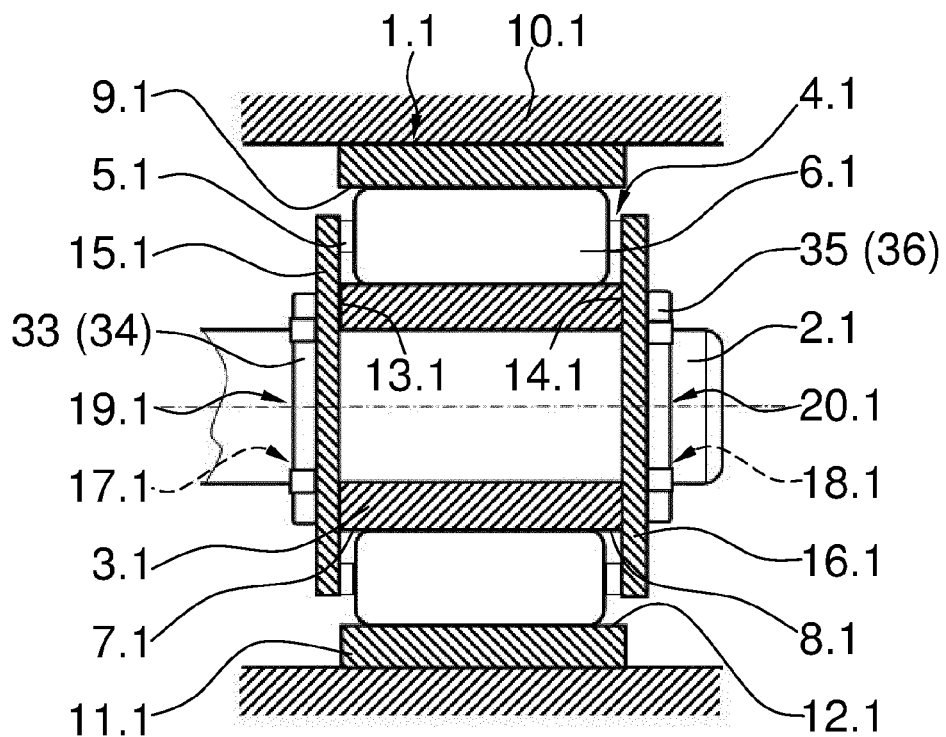
FIG. 4, a schematic representation of the cross-section B-B according to FIG. 5 through a bearing arrangement showing a second type of a radial rolling bearing configured according to the invention.

Further, FIG. 4 shows a schematic representation of a second type of a radial roller bearing 1.1 which differs from the first type through a reversal of functions and is made up substantially of a smooth cylindrical inner ring 3.1 which is slipped onto an axle 2.1 and of a roller crown ring 4.1 which is arranged on this inner ring 3.1. This roller crown ring 4.1 is likewise formed by a plurality of roller-shaped rolling elements 6.1 which are inserted into a bearing cage 5.1 and retained uniformly spaced in peripheral direction by the cage 5.1. These rolling elements 6.1 roll on an inner raceway 8.1 formed by the outer peripheral surface 7.1 of the inner ring 3.1 and on an outer raceway 12.1 formed by the inner peripheral surface 9.1 of a smooth cylindrical outer ring 11.1 which is inserted into a rotating part 10.1. It is to be clearly seen that the axial guidance of the roller crown ring 4.1 is accomplished in this case through two separate flanged disks 15.1, 16.1 that bear against the axial sides 13.1, 14.1 of the inner ring 3.1 and which together with the inner ring 3.1 are fixed in axial direction by fixing elements 19.1, 20.1 which engage into circumferential grooves 17.1, 18.1 in the axle 2.1, which fixing elements 19.1, 20.1 and flanged disks 15.1, 16.1, are likewise configured according to the invention as a fixedly connected assembly.

Figure 5:
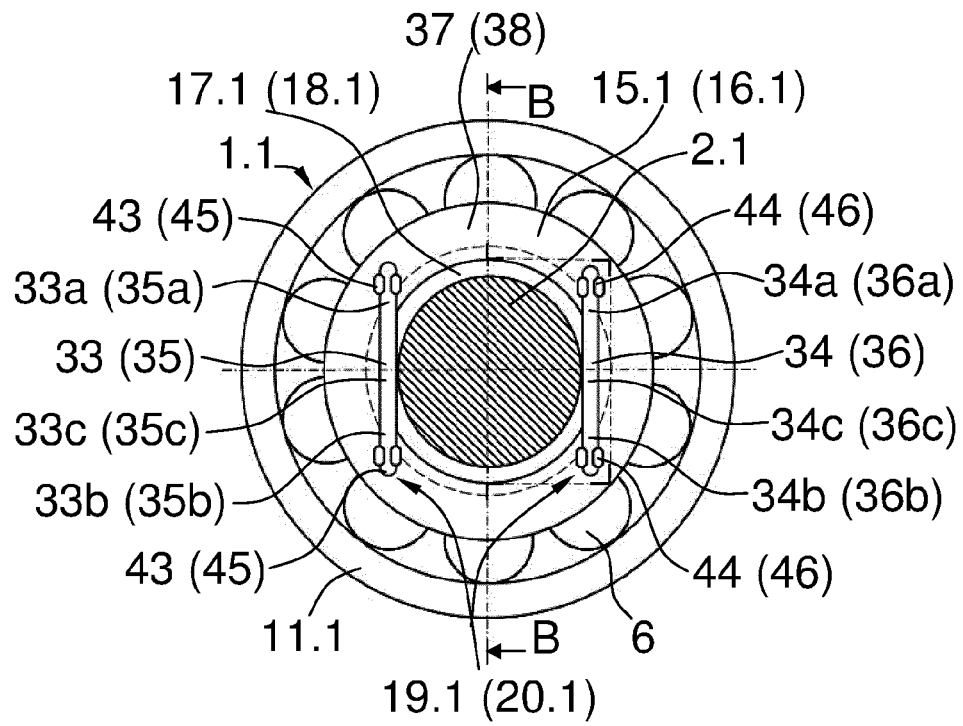
FIG. 5, a schematic representation of a side view of a first form of embodiment of the radial rolling bearing configured according to the invention according to FIG. 4.

The first form of embodiment of such a radial roller bearing 1.1 according to the invention shown in FIG. 5 is characterised by the fact that the fixing elements 19.1, 20.1 are formed respectively by two parallel spring wire segments 33, 34, 35, 36 arranged in a secant-like relationship to the inner diameter of the flanged disks 15.1, 16.1, which spring wire segments are fixed with their ends 33a, 33b, 34a, 34b, 35a, 35b, 36a, 36b on the outer sides 37, 38 of the flanged disks 15.1, 16.1 through stampings 43, 44, 45, 46 coped out of the flanged disks 15.1, 16.1 and are configured to yield elastically outwards in their central regions. It is to be clearly seen that the distance of the spring wire segments 33, 34, 35, 36 from one another is smaller than the diameter of the axle 2.1, so that through their central regions 33c, 34c, 35c, 36c, the spring wire segments narrow the bores in the flanged disks 15.1, 16.1 partially. During assembly of the flanged disks, 15.1, 16.1 the spring wire segments 33, 34, 35, 36 are then likewise widened by force of hand onto the diameter of the axle 2.1 and the flanged disks 15.1, 16.1 are slipped onto the axle 2.1, so that, in their end position, the spring wire segments 33, 34, 35, 36 yield automatically inwards into the circumferential groove 17.1, 18.1 in the axle 2.1.

Figure 6:
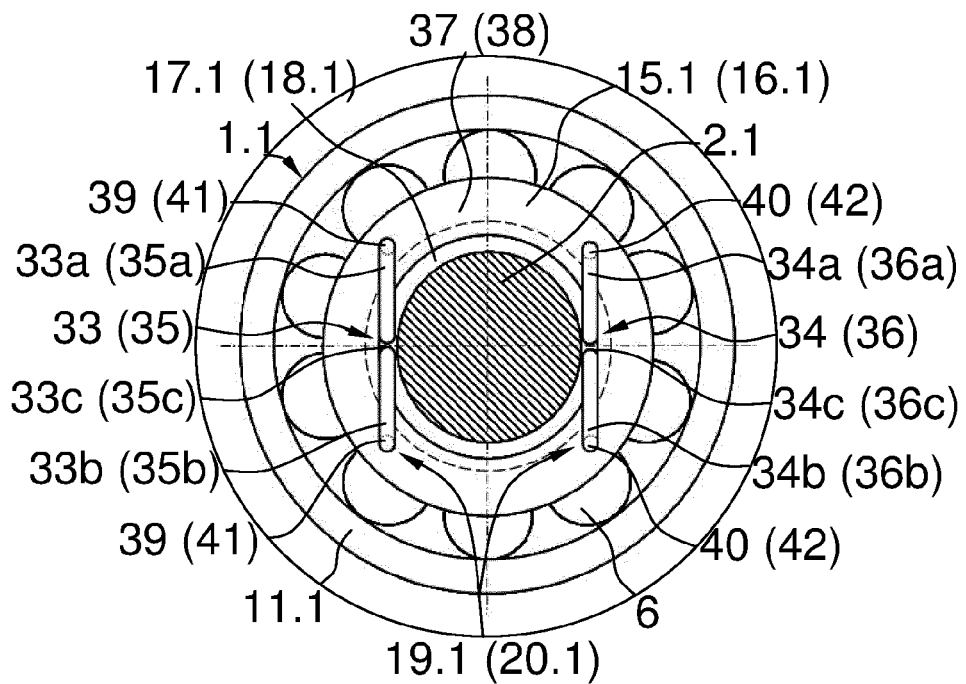
FIG. 6, a schematic representation of a side view of a second form of embodiment of the radial rolling bearing configured according to the invention according to FIG. 4.

Finally, FIG. 6 further shows a second form of embodiment of a radial roller bearing 1.1. configured according to the invention, in which the fixing elements 19.1, 20.1 are formed respectively by two parallel spring wire segments 33, 34, 35, 36 arranged in a secant-like relationship to the inner diameter of the flanged disks 15.1, 16.1, which spring wire segments, however, are fixed with their ends 33a, 33b, 34a, 34b, 35a, 35b, 36a, 36b through welding, soldering or gluing points 39, 40, 41, 42 on the outer sides 37.1, 38.1 of the flanged disks 15.1, 16.1 and are additionally cut apart in their central regions 33c, 34c, 35c, 36c to enhance their elasticity. The assembly of the flanged disks 15.1, 16.1 configured with these fixing elements 19.1, 20.1 is then performed in the same manner as in the first form of embodiment till the spring wire segments 33, 34, 35, 36 yield automatically inwards into the circumferential groove 17.1, 17.2 in the axle 2.1.

| List of reference symbols | |
|---|---|
| 1 | Radial roller bearing |
| 1.1 | Radial roller bearing |
| 2 | Housing |
| 2.1 | Axle |
| 3 | Outer ring of 1 |
| 3.1 | Inner ring of 1.1 |
| 4 | Roller crown ring of 1 |
| 4.1 | Roller crown ring of 1.1 |
| 5 | Bearing cage of 1 |
| 5.1 | Bearing cage of 1.1 |
| 6 | Rolling element of 1 |
| 6.1 | Rolling element of 1.1 |
| 7 | Inner peripheral surface of 3 |
| 7.1 | Outer peripheral surface of 3.1 |
| 8 | Outer raceway for 6 |
| 8.1 | Inner raceway for 6.1 |
| 9 | Outer peripheral surface of 10/11 |
| 9.1 | Inner peripheral surface of 10.1/11.1 |
| 10 | Shaft |
| 10.1 | Rotating part |
| 11 | Inner ring of 1 |
| 11.1 | Outer ring of 1.1 |
| 12 | Inner raceway for 6 |
| 12.1 | Outer raceway for 6.1 |
| 13 | Axial side of 3 |
| 13.1 | Axial side of 3.1 |
| 14 | Axial side of 3 |
| 14.1 | Axial side of 3.1 |
| 15 | Flanged disk on 3 |
| 15.1 | Flanged disk on 3.1 |
| 16 | Flanged disk on 3 |
| 16.1 | Flanged disk on 3.1 |
| 17 | Groove in 2 |
| 17.1 | Groove in 2.1 |
| 18 | Groove in 2 |
| 18.1 | Groove in 2.1 |
| 19 | Fixing element for 15 |
| 19.1 | Fixing element for 15.1 |
| 20 | Fixing element for 16 |
| 20.1 | Fixing element for 16.1 |
| 21 | Spring ring |
| 21a | Small diameter region of 21 |
| 21b | Small diameter region of 21 |
| 21c | Large diameter region of 21 |
| 21d | Large diameter region of 21 |

| List of reference symbols | |
|---|---|
| 22 | Spring ring |
| 22a | Small diameter region of 22 |
| 22b | Small diameter region of 22 |
| 22c | Large diameter region of 22 |
| 22d | Large diameter region of 22 |
| 23 | Transverse axis of 21 |
| 24 | Transverse axis of 22 |
| 25 | Longitudinal axis of 21 |
| 26 | Longitudinal axis of 22 |
| 27 | Outer side of 15 |
| 28 | Outer side of 16 |
| 29 | Semi-segment |
| 29a | Central region of 29 |
| 29b | End region of 29 |
| 29c | End region of 29 |
| 30 | Semi-segment |
| 30a | Central region of 30 |
| 30b | End region of 30 |
| 30c | End region of 30 |
| 31 | Semi-segment |
| 31a | Central region of 31 |
| 31b | End region of 31 |
| 31c | End region of 31 |
| 32 | Semi-segment |
| 32a | Central region of 32 |
| 32b | End region of 32 |
| 32c | End region of 32 |
| 33 | Spring wire segment |
| 33a | End of 33 |
| 33b | End of 33 |
| 33c | Central region of 33 |
| 34 | Spring wire segment |
| 34a | End of 34 |
| 34b | End of 34 |
| 34c | Central region of 34 |
| 35 | Spring wire segment |
| 35a | End of 35 |
| 35b | End of 35 |
| 35c | Central region of 35 |
| 36 | Spring wire segment |
| 36a | End of 36 |
| 36b | End of 36 |
| 36c | Central region of 36 |
| 37 | Outer side of 15.1 |
| 38 | Outer side of 16.1 |
| 39 | Welding, soldering or gluing point |
| 40 | Welding, soldering or gluing point |
| 41 | Welding, soldering or gluing point |
| 42 | Welding, soldering or gluing point |
| 43 | Stamping |
| 44 | Stamping |
| 45 | Stamping |
| 46 | Stamping |

The invention claimed is:

1. A radial roller bearing, comprising:
a smooth cylindrical outer ring inserted into a housing with a roller crown ring arranged in said outer ring, said roller crown ring comprising a plurality of roller-shaped rolling elements inserted and retained into a bearing cage uniformly spaced in a peripheral direction, wherein said rolling elements roll on an outer raceway formed by the inner peripheral surface of the outer ring and on an inner raceway formed by the outer peripheral surface of a shaft or on a smooth cylindrical inner ring carried by the shaft, and
axial guidance of the roller crown ring is effected through two separate flanged disks which bear against the axial sides of the outer ring, said flanged disks being fixed in an axial direction together with the outer ring by fixing elements engaging circumferential grooves provided in the housing, such that the fixing elements for the flanged disks and the outer ring, and the flanged disks are fixedly connected,
wherein the fixing elements are formed by two spring rings of elliptical shape that are smaller on their transverse axes and larger on their longitudinal axes than the diameter of the flanged disks, said spring rings being fixed with their smaller diameter regions on the outer sides of the flanged disks and configured to yield elastically inwards in their larger diameter regions.

2. A radial roller bearing according to claim 1, wherein the fixing elements are fixed on the outer sides of the flanged disks by welding, soldering or gluing.

3. A radial roller bearing according to claim 1, which is a cylindrical roller bearing.

4. A radial roller bearing according to claim 1, which is a needle roller bearing.

5. A radial roller bearing according to claim 1, wherein the fixing elements are fixed on the outer sides of the flanged disks by positive engagement through stampings that are coped out of the flanged disks and surround the fixing elements.

* * * * *